United States Patent [19]
Junttila

[11] 4,089,172
[45] May 16, 1978

[54] POSITION CONTROLLER

[76] Inventor: David W. Junttila, 50794 Jefferson, New Baltimore, Mich. 48047

[21] Appl. No.: 731,998

[22] Filed: Oct. 13, 1976

[51] Int. Cl.[2] .......... B60T 7/00

[52] U.S. Cl. .......... 60/567; 91/411 A; 91/453; 91/460; 91/461; 251/57

[58] Field of Search .......... 60/567, 571, 533; 91/460, 461, 453, 427, 411 A; 92/131, 151; 137/49; 251/57

[56] References Cited

U.S. PATENT DOCUMENTS

| | | | |
|---|---|---|---|
| 2,020,951 | 11/1935 | Lemon | 91/460 X |
| 2,403,391 | 7/1946 | Muir | 91/461 X |
| 2,414,451 | 1/1947 | Christensen | 137/255 |
| 2,879,644 | 3/1959 | Caslow et al. | 91/461 X |

*Primary Examiner*—Edgar W. Geoghegan
*Attorney, Agent, or Firm*—Gifford, Chandler, Van Ophem, Sheridan & Sprinkle

[57] ABSTRACT

A device for infinitely controlling the position of a controlled member along its axis of movement. The device includes hydraulic actuators coaxially secured to the controlled member and a mechanically and/or manually actuated cylinder is fluidly connected to the hydraulic actuator so that by actuation of the cylinder, both the speed and the position of the controlled member along its axis of movement can be carefully controlled.

5 Claims, 2 Drawing Figures

POSITION CONTROLLER

BACKGROUND OF THE INVENTION

I. Field of the Invention

The present invention relates generally to speed and position controllers and, more particularly, to such a device for controlling the speed of a controlled member along an axis of movement.

II. Description of the Prior Art

There are a plurality of previously known controllers, many of which control the position of a member along an axis of movement. These prior devices, however, typically cannot infinitely variably control the position of the controlled member along its travel. Rather, these prior devices can only shift the member to a finite and predetermined number of axial positions.

Furthermore, these previously known devices can control the position, but not the speed, of the member. For many applications, such as valve actuation, it is desirable to control the speed of the member. Lastly, these previously known devices are overly complex in design and, therefore, costly to manufacture. Moreover, due to their complexity and multiplicity of components, these previously known devices are prone to failure.

SUMMARY OF THE PRESENT INVENTION

The present invention overcomes the above-mentioned disadvantages of the previously known position controllers by providing such a device adapted to move a controlled member along its axis of movement which is not only of simple construction but which also can infinitely and variably control not only the position but also the speed of the controlled member.

In brief, the controller of the present invention comprises a hydraulic actuator having a cylinder and a piston axially reciprocally received within the cylinder. The hydraulic piston is coaxially attached to a controlled member and the controlled member arranged so that the extension of the hydraulic piston shifts the controlled member in one axial direction and vice versa.

A manually and/or mechanically actuated cylinder is fluidly connected to the hydraulic actuator so that both the speed and extent of extension or retraction of the hydraulic piston can be carefully controlled which in turn controls the speed and axial position of the controlled member. In addition, the hydraulic actuator cushions the movement of the controlled member which further enhances the positioning capabilities of the position controller of the present invention.

BRIEF DESCRIPTION OF THE DRAWINGS

A better understanding of the present invention will be had upon reference to the following detailed description when read in conjunction with the accompanying drawing wherein like reference characters refer to like parts throughout the several views and in which.

DETAILED DESCRIPTION OF THE PRESENT INVENTION

Figure 1:
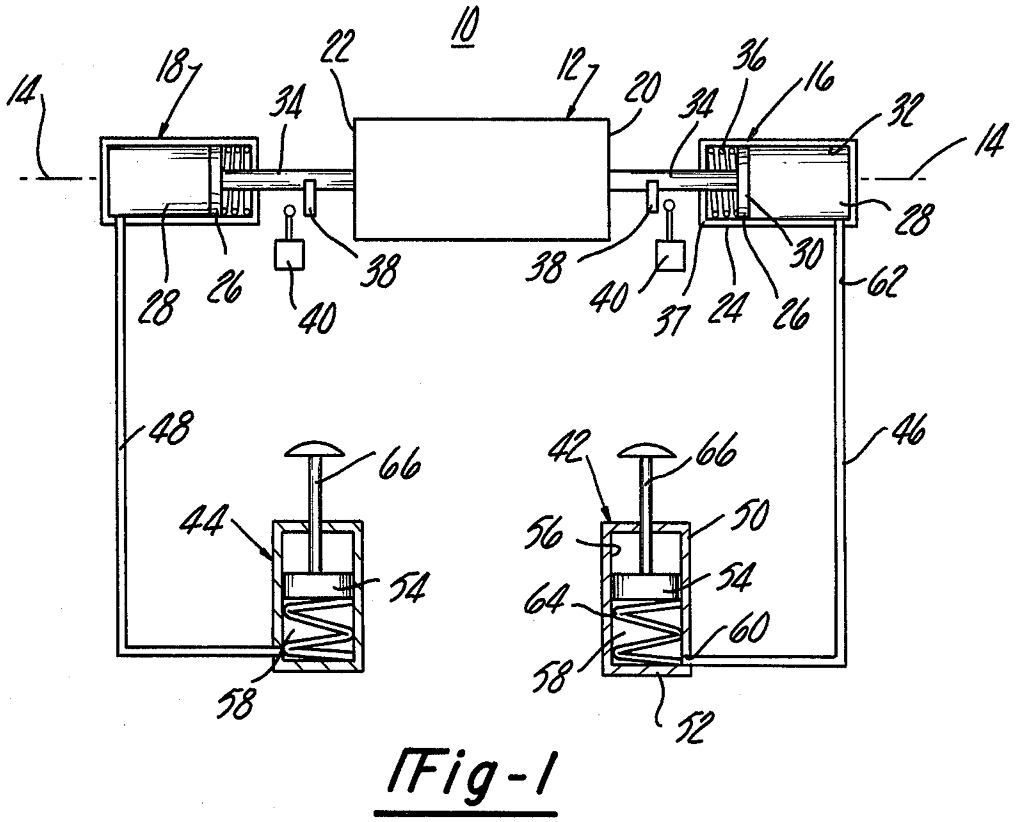
FIG. 1 is a partial sectional view showing the position controller of the present invention.

With reference first to FIG. 1, the speed and position controller 10 of the present invention is thereshown and includes a controlled member 12 which is movable along an axis of movement 14. The controlled member 12 is illustrated schematically and may comprise any movable member. Appropriate channel guides (not shown) may cooperate with the controlled member 12 in order to constrain its movement along the axis of movement 14. It will be understood, however, that the ultimate controlled movement may be other than the axial movement of the controlled member. For example, the controlled member could comprise a crank or lever in order to effect pivotal or other types of mechanical movement.

Preferably a first hydraulic actuator 16 is attached to one axial end 20 of the controlled member 12 in a manner to be shortly described, while a second hydraulic actuator 18 is similarly attached to the other axial end 22 of the controlled member 12. Both of the hydraulic actuators 16 and 18 are substantially identical to each other and each includes a cylinder 24 with a piston 26 axially reciprocally received within the cylinder 16. The volume of a working chamber 28 bounded by the inner axial end 30 of the piston 26 and the inner walls 32 of the cylinder 24 controls the axial position of the piston 26 relative to the cylinder 24.

Each of the actuators 16 and 18 includes an elongated piston rod 34 attached at one end to the controlled member 12 and at its other end coaxially with the respective piston 26. The axes of the piston rods 34 and the hydraulic actuators 16 and 18 are parallel to the axis of movement 14 and are preferably coaxial. Moreover, as is apparent from the drawing, the hydraulic actuators 16 and 18 are arranged in an opposed relationship, i.e., movement of the controlled member 12 in one direction along the axis of movement 14 simultaneously extends one of the pistons 26 outwardly from the cylinder 24 while the other piston 26 is retracted inwardly into its cylinder 24.

Preferably resilient means, such as a helical spring 36, is disposed around each piston rod 34 between the piston 26 and the front 37 of the cylinder 24. For a reason to be later described, the helical springs 36 are preferably in a state of compression and, therefore, urge each respective piston 26 inwardly into the cylinder 24.

Preferably, an annular stop member 38 is coupled to and around each of the piston rods 34. A stationary stop member 40 is positioned to abut against each stop member 38 at the maximum desired travel of the member 12 in order to limit the maximum travel of the controlled member 12 along its axis of movement 14. Only one stationary stop member 40 is required for each annular stop member 38 since the other stationary stop member 40 effectively limits the travel of the controlled member 12 in the opposite direction.

Two manually actuated cylinders 42 and 44 are provided and are fluidly coupled by conduits 46 and 48 to the hydraulic actuators 16 and 18, respectively, in a manner to be shortly described. Each of the cylinders 42 and 44 is substantially identical to each other so that for the sake of brevity, only the cylinder 42 will be described in detail.

The cylinder 42 includes a housing 50 which is preferably cylindrical and tubular in cross-sectional shape and closed at its bottom 52. A piston 54 is axially slidably disposed within the housing 50 so that the piston 54 sealingly engages the inner walls 56 of the housing 50.

The piston 54 forms one wall of a working chamber 58 within the housing 50 and this working chamber is connected by a fluid port 60 and the conduit 46 to a fluid port 62 open to the working chamber 28 in the hydraulic actuator 16. Like the hydraulic actuators 16 and 18, resilient means, such as a compressed helical spring 64, is contained within the working chamber 58 between the piston 54 and the bottom 52 of the housing 50. The spring 64, thus, urges the piston 54 axially outwardly in a direction away from the housing 50.

The cylinder 42 is mechanically and/or manually operated and, for this purpose, an elongated handle 66 is coaxially attached to the upper axial end to the piston 54 and and extends outwardly from the housing 50 for easy access to the handle 66.

In operation, assuming the depression of the handle 66 for the cylinder 42, hydraulic fluid exhausts from the working chamber 58, through the conduit 46 and into the working chamber 28 of the actuator 16. An increase in volume in the hydraulic actuator working chamber 28 in turn extends the piston 26 leftwardly from the actuator 16 and moves the controlled member 12 leftwardly along its axis of movement 14.

Simultaneously, the piston 26 in the hydraulic actuator 18 retracts inwardly into its cylinder 24. Retraction of the piston 26 in turn reduces the volume of the working chamber 28 in the actuator 18 which exhausts hydraulic fluid from the working chamber 28 and into the working chamber 58 in the cylinder 44 via conduit 48. As the volume of the working chamber 58 of the cylinder 44 increases, the handle 66 and piston 54 extend axially outwardly from the housing 50.

The handles 66 for the cylinders 42 and 44, thus, always move in opposite directions due to the opposed relationship of the hydraulic actuators 16 and 18. Consequently, by manually adjusting the pressure on the handles 66 not only the speed but also the extent of movement of the member 12 can be precisely controlled. Moreover, the precise position of the member 12 is accurately and infinitely adjustable along the axis of movement 14 between the stop members 40.

The working chamber 28 in each of the actuators 16 and 18 acts to dampen or cushion the movement of the member 12 along the axis of movement 14. Moreover, upon extension of the piston rods 34, the helical spring 36 within the cylinder compresses and urges the pistons 26 to retract in the cylinder 24.

The helical spring 64 in the working chamber 58 of each cylinder 42 and 44, serves primarily to offset the gravitational weight of the piston 54 with its attached handle 60. The spring 64, thus, insures equilibrium within the cylinder 42 or 44 despite the axial position of the piston 54 within the housing 50.

Figure 2:
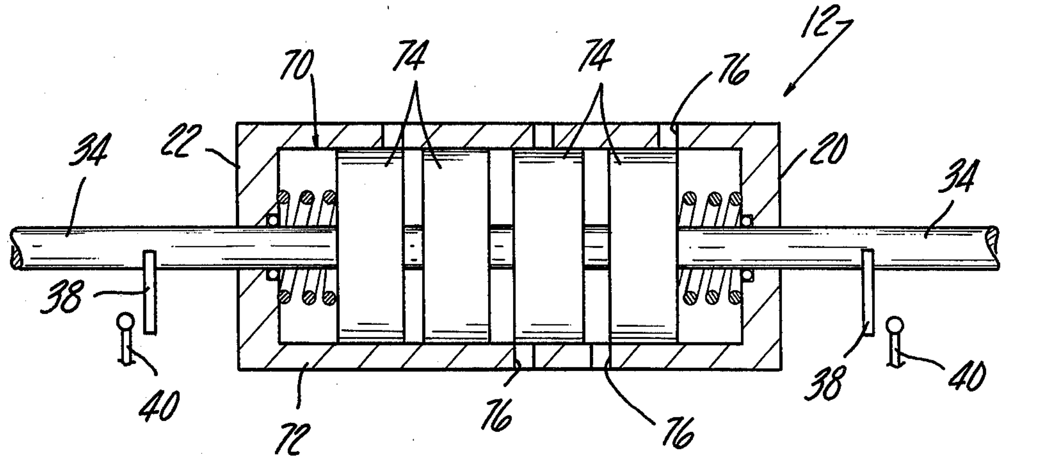
FIG. 2 is a sectional view showing an exemplary controlled member for use with the position controller of the present invention.

It should be apparent that the controlled member 12 may comprise any movable member, such as, for example, a valve actuator, a flow control valve, or an actuator to control the stroke of a hydraulic pump. However, with reference to FIG. 2, an exemplary controlled member 12 is thereshown and comprises a spool valve 70 contained within a valve housing 72 and is movable along the axis of movement 14. A plurality of valve lands 74 on the spool valve 70 selectively open and close ports 76 formed in the valve housing 72 so that both the existence and extent of the fluid communication between the ports 76 is determined by the axial position of the spool valve 70 along the axis of movement 14.

It can thus be seen that the present invention provides a novel position controller whereby not only the precise position, but also the speed of movement of the controlled member 12 can be controlled by simple manual manipulation of the actuators 42 and 44. Moreover, the position controller of the present invention is not only of simple and inexpensive construction, but is also virtually fail-safe and free from maintenance.

It will also be understood that while the speed and position controller 10 of the present invention has been described as comprising a pair of actuators 16 and 18 and a pair of cylinders 42 and 44, the controller 10 of the present invention can consist of a single actuator 16 and a single cylinder 42. In this event the springs 64 and 36 operate to retract the piston rod 34 following an extension of the same.

Having, thus, described my invention, many modifications thereto will become apparent to those skilled in the art to which it pertains without deviating from the spirit of the invention as defined by the scope of the appended claims.

What is claimed is:

1. A device for positioning a controlled member along an axis of movement comprising;
   - a first and second hydraulic actuator, each actuator comprising a tubular cylinder closed at one end and a piston axially slidably disposed in each of said cylinders and defining a working chamber in its respective cylinder between the piston and the closed end of said cylinder, said cylinders being positioned coaxially and on opposite axial ends of said member and in an oppposed relationship,
   - a pair of piston rods, each piston rod being connected at one end to one of said pistons and at its other end to the adjacent axial end of said member,
   - a third and fourth hydraulic actuator, said third and fourth actuators comprising a tubular cylinder closed at one end and a piston axially slidably disposed in each of said last mentioned cylinders and defining a working chamber between each of said last mentioned pistons and the closed end of said last mentioned cylinders,
   - a pair of manually operated handles, each handle being secured at one end to one of said last mentioned pistons and operable to axially displace its respective last mentioned piston whereby the volume of each of said last mentioned working chambers varies proportionately and uniformly with the axial displacement of said pistons by said handles, and
   - a first fluid conduit for fluidly connecting said third actuator working chamber only to said first actuator working chamber and a second fluid conduit for fluidly connecting said fourth actuator working chamber only with said second actuator working chamber,
   - all of said working chambers and said conduits being filled with an incompressible fluid whereby an axial displacement of one of said third and fourth actuator pistons causes an equal but opposite axial displacement of the other third or fourth actuator piston.

2. A device for positioning a controlled member along an axis of movement comprising:
   - a first and a second hydraulic actuator, each actuator comprising a tubular cylinder closed at one end and a piston axially slidably disposed in each of said cylinders and defining a working chamber in its respective cylinder between the piston and the closed end of said cylinder, said cylinders being positioned co-axially and on opposite axial ends of said member and in an opposed relationship, resilient means operatively coupled with said first and second hydraulic actuators for urging the respective pistons axially toward the closed end of said first and second actuator cylinders, a pair of piston rods, each piston rod being connected at one end to one of said pistons and at its other end to the adjacent axial end of said member;

a third and fourth hydraulic actuator, said third and fourth actuators each comprising a tubular cylinder closed at one end and a piston axially slidably disposed in each of said last mentioned cylinders and defining a working chamber between said last mentioned pistons and the closed end of said last mentioned cylinders, a pair of manually operated handles, each handle being secured at one end to one of said last mentioned pistons and operable to axially displace its respective last mentioned piston whereby the volume of each of said last mentioned working chambers varies proportionately and uniformly with the axial displacement of said pistons by said handles, and a first fluid conduit for fluidly connecting said first and third actuator chambers and a second fluid conduit for fluidly connecting said second and fourth actuator working chambers, wherein all of said working chambers and said conduits are filled with an incompressible fluid whereby an axial displacement of one of said third and fourth actuator pistons causes an equal but opposite axial displacement of the third or fourth actuator piston.

3. The invention as defined in claim 2 and including resilient means disposed in said third and fourth actuator working chambers.

4. The invention as defined in claim 3 wherein said resilient means is in a state of compression whereby said resilient means urge said third and fourth actuator pistons axially outwardly from the closed end of its respective cylinder.

5. The invention is defined in claim 2 wherein said controlled member is a spool valve.

* * * * *